N. D. NIELSEN.
HEATING AND COOLING APPARATUS.
APPLICATION FILED SEPT. 19, 1917.
1,383,419.
Patented July 5, 1921.
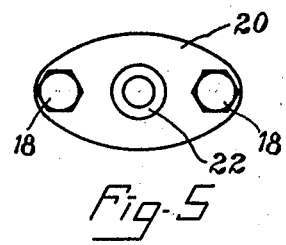
Fig-5
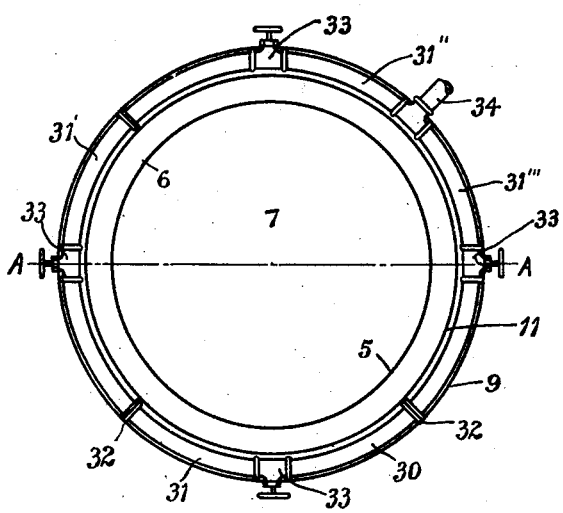
Fig-2
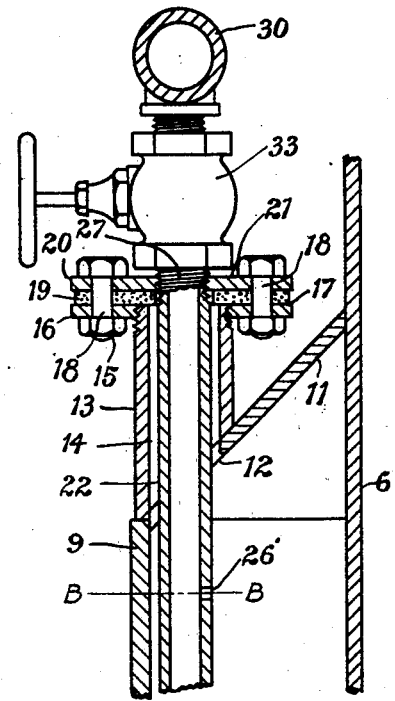
Fig-3
Fig-4
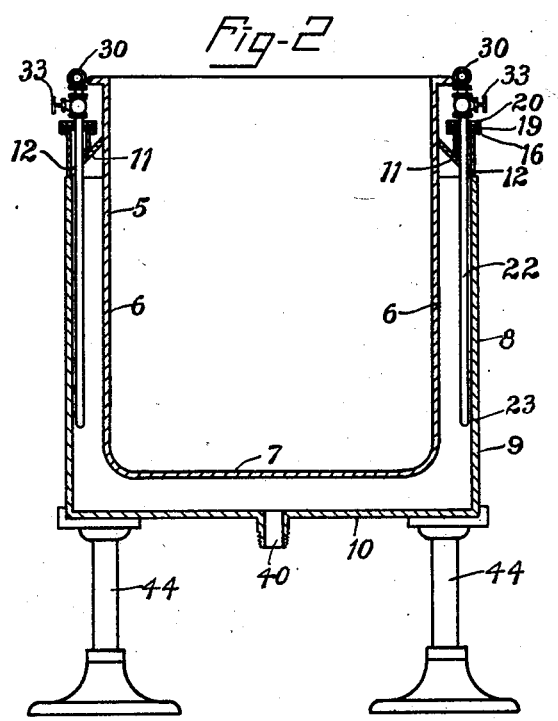
Fig-1
Niels D. Nielsen
INVENTOR.
BY Richey & Adams
HIS ATTORNEYS.

UNITED STATES PATENT OFFICE.

NIELS D. NIELSEN, OF ELYRIA, OHIO.

HEATING AND COOLING APPARATUS.

1,383,419. Specification of Letters Patent. Patented July 5, 1921.

Application filed September 19, 1917. Serial No. 192,113.

*To all whom it may concern:*

Be it known that I, NIELS D. NIELSEN, a citizen of the United States, residing at Elyria, in the county of Lorain and State of Ohio, have invented certain new and useful Improvements in Heating and Cooling Apparatus; and I do hereby declare the following to be a full, clear, and exact description of the invention, such as will enable others skilled in the art to which it appertains to make and use the same.

My invention relates to improvements in apparatus for sprinkling tanks or vats with a fluid for affecting the contents of the vats, such as by changing the temperature thereof.

One of the objects of my invention is to provide means which will distribute the fluid sprinkled against the tanks uniformly over the surface thereof, and which can, at the same time, be conveniently cleaned or removed for cleaning or other purpose.

I also aim to provide means which is simple in construction, easy to assemble, convenient to use and highly efficient.

Other objects of my invention and the invention itself will be understood from a description of the invention.

Figure 1 is a section of an assembly view of an embodiment of my invention taken on the line A—A of Fig. 2. Fig. 2 is a top plan view of the apparatus illustrated in the embodiment shown in Fig. 1. assembled. Fig. 3 is an enlarged detail section of the left hand pipe and related parts shown in Fig. 1. Fig. 4 is a section taken on line B—B of Fig. 3. Fig. 5 is a plan view of the clamping collar and related parts.

Referring now to the drawing and to the embodiment of the invention shown therein, at 5 I have illustrated a tank or vat comprising side walls 6 and a bottom 7. I have here shown a cylindrical tank with a flat bottom, though it will be understood that any shape tank, vat or kettle may be employed. At 8 is shown a jacket surrounding the tank 5 and consisting of the side walls and the bottom 10. The top of the jacket is closed by a flange or apron 11, which, in the embodiment shown, is inclined to the walls of the tank and jacket. The apron is provided with a plurality of openings 12, which may be of any suitable number. In the embodiment shown four have been employed. These openings are shown adjacent the side walls 9 of the jacket.

Supporting means for the sprinkling members are shown at 13 and here consist of stud pipes supported by the jacket, preferably by the apron 11 and the side wall 9, in such position that the bore 14 of the pipe registers with the opening 12. In the embodiment shown, the upper end of the pipe 13 is threaded, as shown at 15 and a flange 16 is threaded thereon. The flange 16 is provided with perforations 17 for bolts 18, which clamp together the flange 16, a heat insulating medium 19 and a collar 20. The collar 20 is provided with a threaded opening 21, into which the sprinkling member 22 is secured.

In the embodiment shown, the sprinkling element consists of a tube 22 closed at the free end 23, and which extends substantially parallel to the side wall of the tank. In the embodiment shown the side wall of the tank being straight, the tube 22 is straight. The tube 22 is provided with a plurality of groups of openings, one of which is shown at 25 in Fig. 4 and consists of three openings 26, 26' and 26'', so directed as to cause the liquid to be distributed in different directions, so as to engage different parts of the walls of the tank. It is obvious that these groups may contain any suitable number of openings and that they may be directed in any suitable manner.

The upper part of the tube is threaded, as shown at 27 and as explained, screwed into the opening 21 in the collar 20, so that both the tube and the collar may be removed by removing the bolts 18. A feed pipe is shown at 30 and in the embodiment shown extends all around the tank. This pipe is preferably made in sections, as shown at 31, 31', 31'' and 31''' in Fig. 2. These sections are connected together in any suitable manner, as by flanges and fastening means, illustrated at 32.

Valves are shown at 33 for controlling the liquid fed from the pipe 30 to the sprinkling members. A supply pipe is illustrated at 34 for supplying liquid to the feed pipe. When it is desired to clean the sprinkling member, the same may be entirely removed by removing the bolts 18 and disconnecting the section of the feed pipe devoted to the particular sprinkling member to be removed, or the tube may be cleaned by disconnecting the valve 33 and the section of the feed pipe devoted to the particular tube to be cleaned by unscrewing the valve from the top of the tube.

It will be apparent that the valves need not be all opened at the same time. It may be advisable during certain times, for instance, over night, to have only one, or possibly two pipes delivering heating or cooling fluid around the container. This may be readily accomplished by shutting off all valves except the one or two desired to be in operation.

Means are provided at 40 for the escape of the liquids sprinkled against the walls of the tank and at 44 are shown supporting means for the apparatus. By making the tube substantially parallel to the walls of the tank, the liquid to be delivered thereto may be equally distributed and at substantially the same velocities, thereby insuring an even film of the liquid over the surface of the walls of the tank, which flows steadily along the same.

Thus, I accomplish one of the objects of my invention, providing means which produces a uniform effect over the surface of the tank and preventing affecting one portion of the contents of the tank more than another.

I have shown this embodiment and these details, for the purpose of better describing my invention. It will be understood that my invention is not limited to these details or this embodiment, as many departures may be made therefrom without departing from the spirit of the invention.

I claim:

1. In apparatus for spraying a tank or vat with a fluid, the combination with said tank of an apron about said tank provided with a plurality of openings, stud pipes vertically mounted about said openings, a flange about the top of each stud pipe, a tube vertically mounted in each stud pipe and extending downwardly therethrough and beyond, each tube provided with a plurality of groups of perforations, each perforation in a group extending in a different direction from the other perforations of that group, a fastening head for each tube provided with an opening into which a tube threads, means to removably fasten said heads to said flanges, a circular sectional feed pipe and means to connect said feed pipe to said tubes, fastening devices to connect the sections of feed pipe together, a valve controlling the supply from the feed pipe to each of the tubes and a supply pipe to supply fluid to the feed pipe.

2. In apparatus for sprinkling tanks or vats with a fluid, the combination with said tank, of a jacket adapted to receive a tank, a plurality of vertically arranged tubes, each provided with a plurality of perforations through which the fluid flows against the walls of the tank, means to removably mount said tubes parallel to the axis of said tank and around the same with the perforations facing the walls of the tank, a pipe for supplying fluid to said tubes comprised of a plurality of sections one for each tube, and means for detachably connecting said sections together.

3. In apparatus for spraying tanks, vats and the like with fluid, the combination with said tank of a plurality of tubes mounted vertically at intervals around the tank, each provided with a plurality of openings directed toward the tank and through which the fluid flows against the walls of the tank, supporting means for said tubes, devices for removably connecting said tubes to said supporting means and feed and supply pipes to conduct fluid to said tubes.

4. In sprinkling apparatus, the combination with a tank of a tube provided with a plurality of differently directed perforations through which the fluid to be sprinkled flows, a fastening head for said tube provided with an opening in which said tube is mounted, a support for said tube provided with a flange, means to removably connect said head to said flange, a duct to supply fluid to said tube, mechanism removably connecting said duct to said tube and a valve controlling the supply of fluid to said tube.

5. In apparatus for spraying a tank or vat with a fluid, the combination with said tank of an apron about said tank provided with a plurality of openings, stud pipes vertically mounted about said openings, a flange about the top of each stud pipe, a tube vertically mounted in each stud pipe and extending downwardly therethrough and beyond, each tube provided with a plurality of groups of perforations, a fastening head for each tube provided with an opening into which a tube threads, means to removably fasten said head to said flanges, a feed pipe and means to connect said feed pipe to said tubes, and a valve controlling the supply from the feed pipe to each of the tubes.

6. In apparatus for spraying tanks or vats, a vat, a feed pipe adapted to surround the top of the vat and spaced therefrom sufficiently to permit removal of the vat, a plurality of free-ended tubes connected to said pipe and extending downwardly along the vat, said tubes having a plurality of holes adjacent the vat to direct streams of fluid thereon in a plurality of directions, and means for removably supporting said feed pipe in position about the vat.

7. In apparatus for spraying tanks or vats, a tank, a jacket member having an inwardly extending apron adapted to receive said tank, said apron having a plurality of holes therein, a stud pipe resting on said apron and being shaped to closely fit against the same, a feed pipe surrounding the tank, tubes joined at one end to said feed pipe and extending downwardly through said holes substantially parallel to the axis of the tank, said tubes having a plurality of holes directed toward the tank in different directions, means for securing the tubes to the stud pipe, and valves in said tubes to control the flow of fluid therein.

In witness whereof, I have hereunto signed my name this 11 day of September, 1917.

NIELS D. NIELSEN.